United States Patent [19]
Mohler

[11] 3,987,373
[45] Oct. 19, 1976

[54] LASER HAVING ETALON ASSEMBLY
[75] Inventor: Galen E. Mohler, Mountain View, Calif.
[73] Assignee: Lexel Corporation, Palo Alto, Calif.
[22] Filed: Mar. 19, 1975
[21] Appl. No.: 560,098

[52] U.S. Cl. ............................................ 331/94.5 C
[51] Int. Cl.$^2$ .......................................... H01S 3/08
[58] Field of Search ............ 331/94.5; 350/288, 304

[56] References Cited
UNITED STATES PATENTS

| | | | |
|---|---|---|---|
| 3,466,565 | 9/1969 | Rigrod | 331/94.5 |
| 3,864,029 | 2/1975 | Mohler | 331/94.5 |

Primary Examiner—William L. Sikes
Attorney, Agent, or Firm—C. Michael Zimmerman

[57] ABSTRACT

An ion laser is described having an etalon incorporated therein so as to provide maximum mechanical and thermal stability of the etalon position, as well as enable the etalon to be tuned by temperature control without contamination of the laser optical cavity by the etalon heating element. The laser includes a resonator structure made up of a pair of reference plates positioned adjacent the ends of the laser optical cavity and maintained in a set, spaced-apart position and orientation by a plurality of resonator rods which are rigidly secured thereto and are made of a material having a low thermal coefficient of expansion. The reference plates are normally provided to facilitate obtaining the stable mounting of the laser optical reflectors relative to the optical cavity necessary for optimum lasing operation. The etalon mounting structure takes advantage of the structural stability of the positioning of the reference plates by being connected to one of them with a tuning bolt-leaf spring arrangement which assures that the stability inherent in the reference plate is transmitted to the mount for the etalon. The etalon is a solid etalon, and a heater oven for stabilizing and tuning the frequency mode selection thereof is mounted on the etalon mounting structure at the exterior of the optical cavity so as to not contaminate either the etalon transmission surfaces or the remainder of the optical cavity.

6 Claims, 3 Drawing Figures

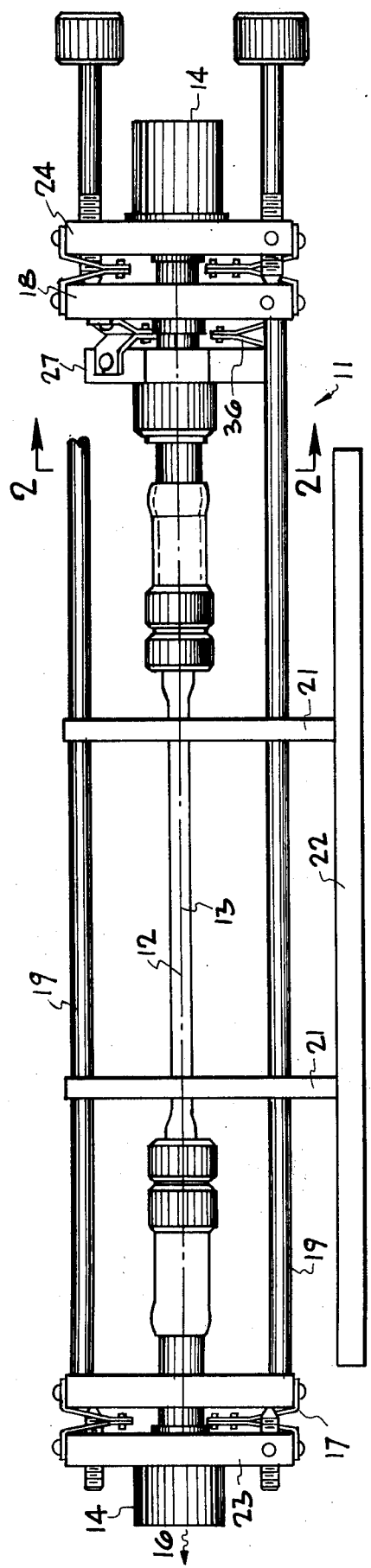
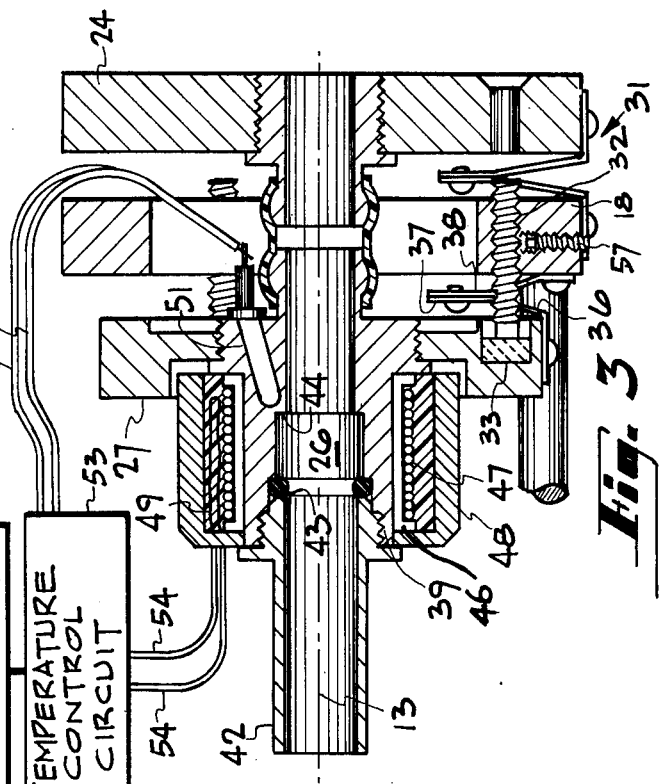
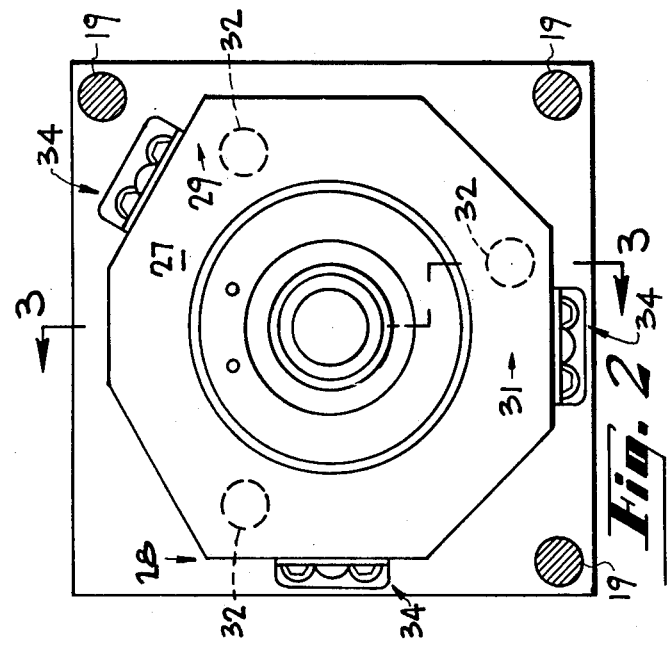

LASER HAVING ETALON ASSEMBLY

BACKGROUND OF THE INVENTION

The present invention relates to lasers and, more particularly, to a laser having an etalon incorporated therein in a manner providing maximum mechanical and thermal stability of the etalon position relative to the laser optical axis. The invention further relates to a laser having a temperature controlled etalon and a heater for the etalon so positioned that efficient and sensitive etalon temperature stabilization is achieved without contamination of the laser optical cavity by the etalon heater components which might, for example, out-gas at operation temperatures.

Typically, the beam emanating from an ion laser includes at each of its normal frequency outputs, a longitudinal mode spectrum made up of a plurality of spectrum lines adjacent the output frequency. In certain uses to which a laser is put, however, such as in holography, high resolution spectroscopy and interferometry, it is desirable and sometimes necessary that the output of the laser be restricted to a single frequency mode. To this end, etalon assemblies have been incorporated into ion lasers to act, in effect, as band pass transmission filters. The etalon, when properly oriented, will pass frequencies close to its transmission peak and reject by reflection frequencies outside the etalon pass band.

In general, there are two different types of etalons used to limit the output of ion lasers to a single longitudinal mode. There is the solid etalon in which the end faces of a solid, transparent body are used as the etalon reflecting surfaces, and there is the air-spaced etalon which is basically two spaced reflecting surfaces defining a resonant cavity. A solid etalon is inherently unstable under varying temperature conditions. That is, changes in the index of refraction of the material from which the etalon is made due to temperature changes will result in so-called "mode hopping" and frequency drift. The air-spaced etalon was developed to overcome this difficulty. Although the air-spaced etalon produces good thermal stability, it must be tuned to different desired modes by changing its angular orientation within the optical cavity. The result is a "walk-off" power loss. Moreover, such an air-spaced etalon will have two more optical surfaces than a solid etalon through which radiation must pass, often resulting in reduced laser power.

In view of the disadvantages inherent in air-spaced etalons, those in the art have overcome the temperature instability of solid etalons by including a heating element with the same to stabilize its temperature. The inclusion of the heating element also enables the solid etalon to be tuned by taking advantage of the change in the index of refraction with temperature. That is, by intentionally changing the temperature of the material of the etalon, the longitudinal mode selected by the etalon for transmission can be correspondingly changed.

Presently available laser etalon assemblies, however, are not ideal and their employment in a laser in-of-itself does not always provide the accurate single frequency operation required for some uses. In this connection, it is quite important that the mechanical positioning of the etalon with respect to the remainder of the optical cavity be maintained quite stable in order to prevent mode hopping and frequency drift. Moreover, present constructions utilizing a heater for a solid etalon are not satisfactory in that gases and the like which evolve from the surfaces of the heater elements and other components contaminate not only the etalon reflecting surfaces, but also other parts of the optical cavity.

SUMMARY OF THE INVENTION

The present invention provides a laser having an etalon assembly integrated therein in a manner which obviates the above problems. This is achieved by, for one thing, directly connecting the etalon assembly with a portion of the laser resonator structure which is extremely stable, both mechanically and thermally. This resonator structure is defined by a pair of spaced apart reference plates which are maintained at a predetermined relative orientation and spaced distance apart at opposite ends of the laser optical cavity by connecting structure having low thermal expansion in the direction of the laser optical axis. These reference plates are primarily maintained set relative to one another so as to provide a base from which the optical reflectors of the laser can be maintained in predetermined positions relative to one another. However, as a salient feature of the invention, mounting structure for positioning an etalon in the path of optical energy passing along the laser optical axis is also connected directly with one of these resonator reference plates so as to be maintained thereby in a selected position and orientation along such optical axis. With this construction, any mechanical or thermal instability in the positioning of the etalon will be limited to that occurring in the reference plates and the mounting structure extending between the same and the etalon. However, since the reference plates are major components of the resonator structure and are positioned relative to one another by connecting structure having low thermal expansion, there will be substantially no mechanical instability caused by the same. Most desirably, the mounting structure extending between the reference plate and the etalon also includes a mounting plate rigidly associated with the etalon, which mounting plate is positioned in close proximity to and directly connected to the reference plate by the same leaf spring-tuning bolt construction described for a mirror mount in my U.S. Pat. No. 3,864,029 issued Feb. 4, 1975, the disclosure of which is hereby incorporated by reference. As described therein, this particular connecting structure provides a highly stable mechanical connection while yet enabling position and orientation adjustment.

As another salient feature of the instant invention, it provides an arrangement for stabilizing the temperature of a solid etalon, i.e., an etalon whose effective optical length is temperature dependent, which is quite sensitive and yet will not result in out-gassing contamination of either the etalon surfaces or the optical cavity. In general such arrangement includes as part of the mounting structure for the etalon, a casing defining a portion of the optical cavity enclosure, and a heater oven which circumscribes such casing for directing heat energy therethrough to the etalon. With such an arrangement, the heating element, the portion of the structure which is responsible for the majority of out-gassing, is hermetically separated from both the etalon and the optical cavity by the casing. Most desirably, the oven is constructed as will be described to preferentially direct thermal energy generated by the heating element inwardly to the etalon.

The invention includes other features and advantages which will be described or will become apparent from the following more detailed description of a preferred embodiment:

BRIEF DESCRIPTION OF THE DRAWING

With reference to the accompanying single sheet of drawing:

FIG. 1 is an elevation view of a laser incorporating a preferred embodiment of the invention;

FIG. 2 is an enlarged sectional view taken on a plane indicated by the lines 2—2 in FIG. 1, illustrating the mounting structure for the etalon; and FIG. 3 is an enlarged elevation sectional taken on planes indicated by the lines 3—3 in FIG. 2, illustrating the manner in which an etalon is incorporated into the laser structure, as well as a heater oven therefor with a schematic illustration of means for controlling the same.

DETAILED DESCRIPTION OF A PREFERRED EMBODIMENT

With reference first to FIG. 1, an ion laser 11 is illustrated which incorporates the present invention. As is conventional, the laser 11 includes an elongated plasma tube or envelop 12 which encloses a lasable medium, i.e., quantum resonant particles, such as an ionized noble gas, at a pressure of about 1 torr. As is also conventional, means (not shown) such as an electrode and a power source, are provided for initiating an electrical discharge in the lasable medium. The result will be that optical radiation will be propagated along the axis 13 of the tube, which radiation will pass through windows at the opposite ends of the tube 12 and be reflected by optical reflector assemblies or mirrors 14 at such ends back and forth through the tube a sufficient number of times to sustain laser oscillation. Normally, when an etalon is included as will be described, one of the optical reflector assemblies includes a dispersive element, such as a prism, for selecting a component of the radiation having a desired wavelength. Transmission of optical radiation as represented at 16 through one of the reflectors constitutes the coherent light radiation output of the laser.

The space between the mirrors 14 through which optical radiation or energy is oscillated is referred to as the "optical cavity" of the laser, which optical cavity includes the interior of the envelop 12. The optical cavity apart from the envelop 12 is enclosed to be maintained dust free and otherwise isolated from the ambient atmosphere in order to reduce optical losses due to reflection and absorption. As used herein, the optical cavity includes the full spacial volume which is separated from the ambient atmosphere. Such volume is defined by the inner surface of those structural components which separate the optical cavity from the ambient atmosphere hermetically at the little or no difference in pressure which exists between the ambient and optical cavity atmospheres. The axis 13 of the lasing tube as extended through the optical cavity is referred to as the optical axis of the laser.

An ion laser further includes structure, commonly called resonator structure, which defines the optical cavity and, in particular, maintains the reflectors or mirrors at its opposite ends at predetermined relative orientations and a set distance apart. The preferred embodiment of the invention being described includes such a resonator structure which is quite stable mechanically and thermally. To this end, it includes a pair of rectangular reference plates 17 and 18 respectively positioned adjacent opposite ends of the laser optical cavity. The plates 17 and 18 are rigidly held in position relative to one another by a plurality (in this case three) rods 19 extending therebetween. The rods 19 are selected to have low thermal expansion in the direction of the laser optical axis over the ambient temperature range to which they are expected to be subjected during operation of the laser. While there are various materials having a low thermal coefficient of expansion which are suitable for the rods 19, it is preferred that they be of a metal alloy such as that sold under the trademark "Invar" which is especially formulated to be dimensionally insensitive to thermal changes.

The rods 19 are spaced apart and generally coextensive, with their ends being rigidly secured to the reference plates to thereby maintain the same in a rigid position. They are connected between three of the four corners of the reference plates to provide three-point relative rigidity between such plates. In this connection, the positioning of the rods at the reference plate corners assures that all parts of the reference plates around the periphery thereof are maintained at the desired relative spacing from one another. The rods 19 and, hence, the remainder of the laser are supported by uprights 21 projecting from a base 22. The uprights 21 can also provide support in the vertical direction for the laser tube 12.

Because of the mechanical rigidity by which the reference plates 17 and 18 are maintained, such reference plates are used to provide a reference base from which the optical reflectors 14 of the laser are mounted at opposite ends of the optical cavity. In this connection, the reflector assemblies include rectangular mounting plates 23 and 24 which are positioned parallelly adjacent the respective reference plates 17 and 18 and are secured thereto by the tuning bolt-leaf spring separator arrangement described in my previously mentioned U.S. Pat. No. 3,864,029. As brought out in such patent, such arrangement enables precise and stable angular orientations of the laser reflectors with respect to the optical axis to be achieved. Since such arrangement and its operation is adequately described in such patent, it will not be described in detail here.

The present invention includes an etalon and mounting structure therefor which takes advantage of the stability of the reference plates and, hence, the mounts for the mirrors, to maintain the etalon in a predetermined orientation on the laser optical axis in the path of optical energy. In this connection, an etalon, generally referred to by the reference numeral 26 (FIG. 3), preferably of the solid type such as of fused silica, is positioned within the optical cavity of the laser as shown. The optical cavity at and near the location of the etalon is hollow and has a cylindrical shape as shown. It is defined by the inner peripheral surfaces of various aligned components to be described.

The mounting structure for the etalon is so connected with the reference plate 18 that the mechanical and thermal stability of such reference plate relative to the optical axis of the laser is transmitted to the etalon. More particularly, the etalon mounting structure includes an octagonal mounting plate 27 positioned parallel to and inwardly adjacent the reference plate 18. The peripheral octagonal shape of the plate is dictated by simplicity of it fitting into its location in the laser without interfering with either the resonator rods 19 or the remainder of the structure. The mounting plate 27 is rigidly associated with the etalon 26 and is connected to the reference plate 18 by basically the same tuning bolt-leaf spring connecting structure utilized to connect the mirror mount plate 24 on the opposite side thereof. More particularly, such connecting means includes three separate connections 28, 29 and 31 (FIG. 2), each of which is spaced from the optical axis and is spaced from the other ones of such connections. Each of the connecting means 28-31 includes two components, a separator which extends between the reference and etalon mounting plates to maintain the same spaced apart at the location of the respective connecting means and a leaf spring which resiliently urges such plates toward one another at such location by maintaining a compressive force on the separator. The separator of each of the connecting means is defined by a tuning bolt 32 which threadably passes through the reference plate and abuts or bears against the mounting plate 27. In this connection, the mounting plate 27 is provided at the locations at which the tuning bolts bear thereagainst with inset discs 33 of a hard material, such as of a carbide, which will not yield to the compressive force exerted by the separator. Each of the connections further includes a leaf spring, generally referred to by the reference numeral 34, for resiliently urging the reference and mounting plates toward one another at the location of the connection of which it is a part. To this end, the opposite ends of each of the leaf springs 34 are respectively secured to the reference and mounting plates, and the spring includes an expansion and contraction joint which is under tension between such opposite ends. The expansion and contraction joint is provided by a reentrant portion 36 which extends transversely of the direction along which the tuning bolt extends between the plates. As discussed in my earlier patent, this transverse relationship of the leaf spring reentrant portion to the direction of movement of the tuning bolts provides the desired expandable joint without there having to be parallel or rotational displacement between the plates when they are separated by adjusting the tuning bolts. The expandable joint 36 is simply provided by forming each of the leaf springs from a pair of leaf portions 37 and 38 having first ends secured respectively to the mounting and reference plates. The remainder of each of the leaf portions, i.e., that portion of each which is positioned between the mounting and reference plates, extends generally transversely of the associated tuning bolt 32. Such leaf springs then terminate in second ends which are conventionally secured together in a rigid manner.

As is also discussed in my earlier patent, each of the leaf spring portions 37 and 38 are made, for example, of a spring steel and the rigid securance together of their adjacent ends tends to maintain the same abutting one another for the full length thereof located between the reference and mounting plates. However, because of the securance of the opposite ends of each of such portions to the respective plates 18 and 27, the leaf spring portions are forced apart. It is the resistance to such separation of the leaf spring portions which provides the compressive force on the tuning bolt 32.

It is to be noted that the expansion and contraction joints of each of the connections 28-31 are free of one another. This means that changes in the distance between the two plates at the location of one of the connections will not be inhibited by the other connections.

The above connecting means arrangement transmits the mechanical and thermal stability of the reference plate 18 relative to the laser optical axis to the etalon mounting plate 27. While the use of such a connecting means is particularly appropo to connecting the mounting plate to one of the reference plates of the instant resonant structure in which such reference plates are maintained quite stable, it will be appreciated by those skilled in the art that it would also find use in securing etalon mounting structures to other reference structures. However, its use can provide no more mechanical and thermal stability than is inherent in the reference structure.

The etalon 26 is maintained in rigid association with the mounting plate 27 by being rigidly mounted within a casing 39 which, in turn, is rigidly mounted via a thread connection to the mounting plate 27. Such etalon is abutted against a circumferential flange 44 cut within the inner peripheral surface of the casing and is held in position by a tubular cap portion 42. As shown, the tubular cap portion 42 is threadably received within the end of the casing 39 and its end normally bears through an O-ring seal 43 against the etalon to maintain the same against the shoulder 44. The O-ring seal 43 prevents contamination of the etalon or the remainder of the optical cavity by gas or particulate leakage through the threaded joint between the cap 42 and the casing 39.

As previously mentioned, the etalon assembly includes a heater oven which enables the temperature of the etalon to be controlled for stabilization and tuning. Such heater oven is so located and mounted with respect to the etalon and its mounting structure that good heat transfer to the etalon is assured even though the heater is hermetically isolated therefrom to prevent contamination of either the etalon surfaces or the remainder of the optical cavity caused by out-gassing of its heating elements or other components. Such heater oven is in the form of a collar on casing 39 and is partially defined by an inner spool 46 which circumscribes the casing and is in good thermal relationship therewith. The heater element is provided by an electrical resistance wire wrapping 47 about spool 46. As shown, the wire wrapping extends lengthwise of the spool and extends beyond the ends of the etalon. This will assure that heat generated in the wire and transmitted through the spool and casing to the etalon will be thermally uniform along the axis of the etalon.

An outer cylindrical housing 48 peripherally surrounds the wire wrapped spool and is spaced therefrom by a thermal insulating material 49. The material 49 is conveniently an epoxy having low thermal conductivity which is cured within the oven collar after the previously described structural components are assembled.

With such an arrangement, the heat generated by the passage of current through the resistance wire wrap 47 will be preferentially directed inwardly through the spool and casing to the etalon. In this regard, the tubular casing 39 is relatively thick at its location surrounding the etalon so that it will act as a heat sink tending to prevent hot spots from being generated and transmitted to the etalon. The etalon is peripherally in good thermal relationship (via convection) with the inner surface of the casing in order to be responsive to temperature changes of such casing.

Means are provided for regulating the heater oven to provide temperature control of the etalon. More particularly, a thermal transducer, such as the thermister 51, is embedded within the casing 39 with its temperature sensitive portion positioned closely adjacent the etalon. Such transducer will therefore detect the temperature of the casing at its location, which temperature will be directly proportional to the temperature of the etalon. The transducer signal is fed as schematically shown by the lines 52 to a conventional temperature control circuit 53 which compares the same with a reference temperature setting and generates an output on lines 54 to energize the heating element when necessary to conform the temperature detected by the transducer with such reference temperature and, thus, to maintain the etalon at a predetermined temperature. Temperature adjustment means, such as a reostat, is schematically illustrated at 56 and is connected with the temperature control circuit for varying the predetermined or set reference temperature. In this manner, the temperature of the etalon can be correspondingly varied to change its index of refraction and, hence, the longitudinal mode to which the same is tuned.

The temperature control arrangement for the etalon thus serves not only to provide temperature stabilization to prevent frequency drift, it also provides a simple means of selecting a desired single longitudinal mode of the laser output. It should be noted, though that it is generally necessary that the orientation of the etalon be mechanically adjusted at least initially after the laser is assembled with the etalon. The tuning bolt and leaf spring connections discussed above enables such initial mechanical adjustment. Once such initial adjustment is made, though, it is desirable that it be relatively permanently set and all subsequent tuning be simply accomplished by adjusting the reference temperature to which the temperature control circuit 53 responds. To facilitate such permanent setting of the mechanical adjustment, a set screw 57 (FIG. 3) is associated with each of the tuning bolts and can be threaded into engagement with the same to prevent unintended rotation of such tuning bolt.

From the above, it will be seen that the invention provides incorporation of an etalon into a laser in a manner which takes advantage of the stability normally provided for the optical reflectors to obtain a similar stability in the mechanical positioning of the etalon. Moreover, a heating arrangement for the etalon is so associated with the etalon that out-gassing from its heating element will not contaminate either the etalon surfaces or the remainder of the optical cavity. In this connection, the heater oven is positioned entirely outside the optical cavity and the only optical cavity joint closely spaced thereto is sealed by the O-ring 43.

It will be apparent to those skilled in the art that various changes and modifications can be made without departing from the spirit of the invention. It is, therefore, intended that the coverage afforded applicant be limited only by the claims and their equivalent language.

What is claimed is:

1. A laser including an elongated optical cavity separated substantially hermetically from the atmosphere ambient to said laser, a portion of which cavity encloses a lasable medium and through which optical energy passes along an optical axis; an etalon for single frequency mode selection whose effective optical length is temperature dependent; mounting structure positioning said etalon within said cavity for said mode selection in the path of optical energy passing along said optical axis; a heating element externally of said optical cavity for controlling the temperature of said etalon, said mounting structure including a casing inwardly of said heating element hermetically separating said heating element from both said etalon and said optical cavity, the periphery of said etalon being in good heat transferring relationship with the inner surface of said casing and said heating element being contained within a heater oven collar mounted circumscribing said casing in good heat transferring relationship therewith; a thermal transducer positioned to measure the temperature of said etalon; and temperature control means responsive to said measurement by controlling the energy input to said heater to maintain said etalon at a predetermined temperature.

2. The laser of claim 1 wherein said heater oven collar is defined by an inner spool in good thermal contact with said casing and about which electrically resistant wire is wrapped to provide said heating element, a thermal insulating material circumscribing said spool and said heating wire element, and an outer cylindrical housing for the same.

3. The laser of claim 1 further including temperature adjustment means connected with said temperature control means for varying the predetermined temperature at which said temperature control means maintains said etalon.

4. The laser of claim 1 wherein said laser further includes a resonator reference plate which is mounted rigidly with respect to said optical cavity; and said mounting structure for said etalon further includes a mounting plate to which said casing is rigidly secured, and connecting means extending directly between said mounting plate and said reference plate maintaining said mounting plate in a predetermined orientation with respect to said reference plate, said means connecting said mounting plate to said reference plate including:

A. a first connection between said reference plate and said mounting plate spaced from said optical axis;

B. a second connection between said reference plate and said mounting plate at a second location spaced both from the location of said first connection and said optical axis;

C. said first connection having:
   1. a separator which extends between said reference plate and said mounting plate at said first location for maintaining the same spaced apart thereat, the length of said separator along a path extending directly between said reference plate and said mounting plate at said first location being selectively variable; and
   2. spring means having opposite ends respectively secured to said reference plate and said mounting plate and being in tension therebetween to resiliently urge said reference plate and said mounting plate toward one another at the location of said first connection by maintaining a compressive force on said separator, said spring being characterized by including an expansion and contraction joint under tension between said opposite ends enabling said spring to lengthen and shorten to compensate for changes in the distance between said reference plate and said mounting plate while maintaining a compressive force on said separator;

D. said expansion and contraction joint being free of said second connection for changes in the distance between said reference plate and said mounting plate at the location of said first connection independently of distance changes therebetween at the location of said second connection.

5. The laser of claim 4 further including a second resonator reference plate, said reference plates being respectively positioned adjacent opposite ends of said optical cavity; and resonator connecting structure having low thermal expansion in the direction of said optical axis over the ambient operating temperature range of said laser extending between said two reference plates to maintain the same at a set distance apart, said resonator connecting structure including a plurality of generally coextensive, spaced-apart rods of a material having low thermal expansion over the ambient operating temperature range of said laser rigidly secured at their ends to said reference plates to thereby maintain the same in said spaced-apart relationship.

6. The laser of claim 5 further including a pair of optical reflectors; and mounting structure for mounting each of said optical reflectors on an associated one of said reference plates, said mounting structure for each of said reflectors including a reflector plate to which its associated reflector is rigidly mounted and means connecting said reflector plate to said reference plate, said connecting means including:
   A. a first connection between said reference plate and said reflector plate spaced from said optical axis;
   B. a second connection between said reference plate and said reflector plate at a second location spaced both from the location of said first connection and said optical axis;
   C. said first connection having:
      1. a separator which extends between said reference plate and said reflector plate at said first location for maintaining the same spaced apart thereat, the length of said separator along a path extending directly between said reference plate and reflector plate at said first location being selectively variable; and
      2. a leaf spring having opposite ends respectively secured to said reference plate and said reflector plate and being in tension therebetween to resiliently urge said reference plate and said reflector plate toward one another at the location of said first connection by maintaining a compressive force on said separator, said leaf spring being characterized by including an expansion and contraction joint under tension between said opposite ends enabling said spring to lengthen and shorten to compensate for changes in the distance between said reference plate and said reflector plate while maintaining a compressive force on said separator;
   D. said expansion and contraction joint being free of said second connection for changes in the distance between said reference plate and said reflector plate at the location of said first connection independently of distance changes therebetween at the location of said second connection.

* * * * *